United States Patent Office 3,824,112
Patented July 16, 1974

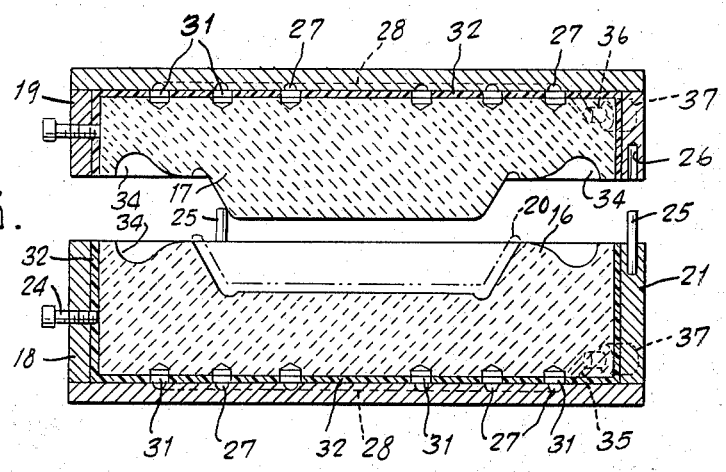
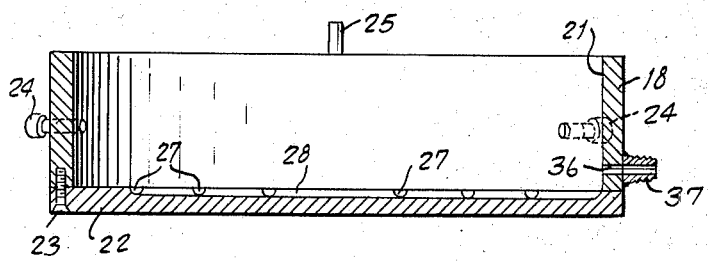
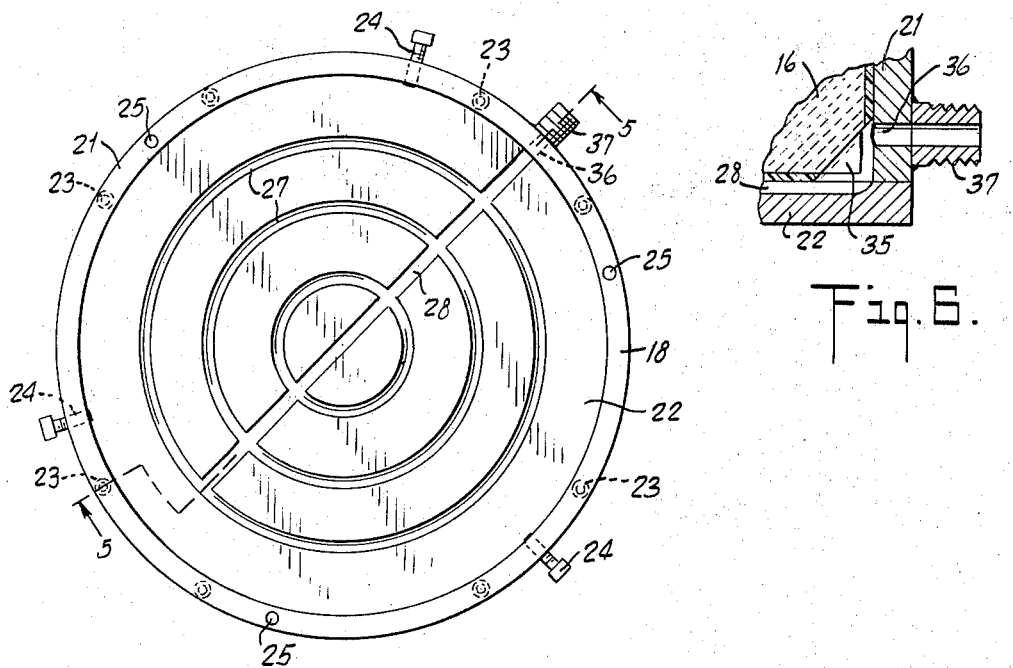

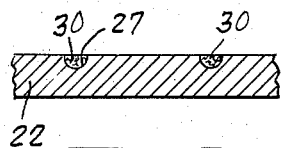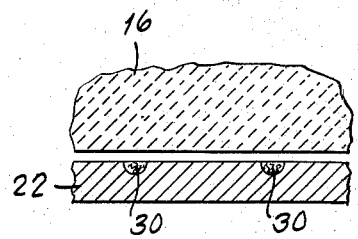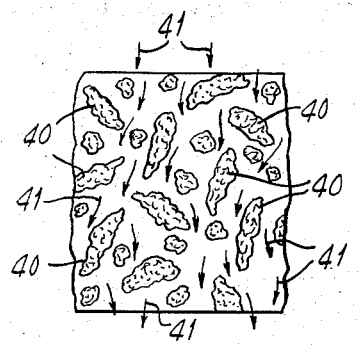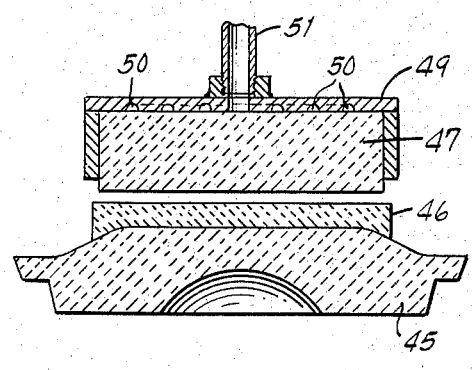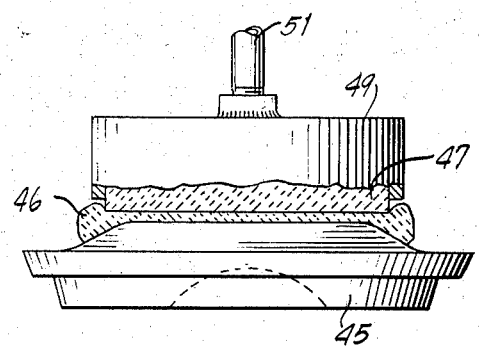

3,824,112
PERMEABLE WOLLASTONITE CERAMIC MASS
Willis G. Lawrence, Alfred, and Leon B. Coffin, Andover, N.Y., assignors to Research Corporation, New York, N.Y.
Application July 1, 1970, Ser. No. 56,104, now Patent No. 3,641,229, which is a continuation of application Ser. No. 735,161, Feb. 23, 1968, which is a continuation-in-part of application Ser. No. 511,407, Dec. 3, 1965, which in turn is a continuation of application Ser. No. 194,048, May 11, 1962, the latter all now abandoned. Divided and this application Nov. 13, 1971, Ser. No. 195,509
Int. Cl. B28b 7/34; C04b 21/00, 35/22
U.S. Cl. 106—38.3                    1 Claim

ABSTRACT OF THE DISCLOSURE

A permeable ceramic structure is prepared by forming a uniform admixture comprising finely divided, high melting point refractory ceramic material, finely divided fluxing material and hydrated silica gel, the melting point of the fluxing material being below the melting point of the refractory ceramic material. The resulting admixture is then heated to a temperature to dehydrate the silica gel and to fuse the fluxing material to provide a resulting permeable ceramic structure wherein the components thereof are held together by means of a glassy bond derived by fusing said fluxing material.

---

This application is a division of application Ser. No. 56,104 filed July 1, 1970, now U.S. Pat. 3,641,229, which is a continuation of application Ser. No. 735,161 filed Feb. 23, 1968, now abandoned, which is a continuation-in-part of application Ser. No. 511,407 filed Dec. 3, 1965, now abandoned, which is a continuation of application Ser. No. 194,048 filed May 11, 1962, now abandoned.

This invention relates to permeable ceramic structures and compositions and methods of making the same.

There has long been a need for hard, durable material that is highly permeable to fluids, such as liquids or gases, but in which the communicating pores producing the permeability are of such small size as to resist being filled or plugged by solid matter and to provide substantially smooth surfaces.

In the pressing of ceramic ware from wet clay, for example, it has not heretofore been possible to approach in a practical way the theoretical ideal in pressing from the clay the water of plasticity down to the critical moisture content so as to eliminate drying shrinkage of the green ware. One obstacle has been the lack of a material for the molds or dies combining sufficient permeability and strengh with smooth, non-plugging working surfaces.

Prior efforts to produce such molds or dies for the ceramic industry have included passing fluid through plaster of Paris molds while the plaster is setting in order to produce some degree of permeability in the mold. Such molds have been used to some extent but do not have either sufficient strength or sufficient permeability in a high speed production operation to approach the desired result. Efforts to use sintered powdered metal molds have been unsuccessful because wet clay extrudes into the pores under pressure, resulting in non-uniformity of release of the ware.

According to the present invention a material is produced which fills this need in the ceramic industry and in other fields by combining high strength and hardness, high permeability and with pores opening onto the working surfaces of such fineness and uniformity of distribution as to provide substantially smooth surfaces preventing extrusion or interlocking with wet clay and providing instant release from pressed ware.

Broadly, an article of composition in accordance with the present invention is produced by preparing a form containing an admixture comprising ground, relatively high melting, refractory, ceramic aggregate or material, preferably refractory ceramic material having needle-like structure, such as wollastonite or mullite, and a ground ceramic fluxing material having a relatively low melting point, such as a melting or fusion point below the aforesaid refractory material and capable upon fusion to form a glassy material, and uniformly distributed in said admixture a substantial amount or percentage of hydrated silica gel. After the admixture in the form has been given an initial set, the form, together with the material therein, is heated to dehydrate the silica gel constituent with resultant shrinkage in and around the refractory ceramic material and fluxing material to produce a multitude of inter-communicating pores extending throughout the entire admixture filling the form. Thereupon, the admixture is then fired at a temperature above the relatively low melting point of the fluxing material therein to sinter and bond the admixture together by means of a glassy bond derived by fusing said fluxing material.

The hydrated silica gel in the admixture is preferably incorporated therein by mixing the dry ground relatively high melting point refractory ceramic aggregate and the dry ground relatively low melting point fluxing material with hydrolyzed ethyl silicate 40 which is a mixture of ethyl polysilicates with a silicate content of about 40% and hydrolyzed to a silica content of about 5–25%, followed by alkalizing the resulting admixture to produce hydrated silica gel and water and drying the admixture to the initial set. The most desirable combination of properties in the finished permeable ceramic material or product is obtained from a refractory ceramic aggregate consisting principally of wollastonite ground or crushed to 100 mesh (149 microns) and smaller and including a small percentage in the range 5–10% alumina, together with about 10% of a relatively low melting point flux or fluxing material, such as anhydrous borax, and a small amount of an alkalizing agent, such as magnesium oxide. The dry materials are homogeneously admixed with hydrolyzed ethyl silicate and a small amount of a surfactant or wetting agent to improve the mixing. To retard the chemical reaction and to facilitate setting and drying of the resulting admixture without cracking the water content of the admixture is maintained at a minimum. It has been found that when the admixture is placed in a mold of the desired shape and vibrated therein the admixture flows thixotropically into conformity with the mold surfaces. The magnesium oxide component of the admixture dissolves slowly in the aqueous component, gradually increasing the pH to effect reaction of the ethyl silicate to provide a preliminary green set of the resulting admixture.

The resulting formed green set admixture is taken from the mold and dried slowly, such as at a temperature in the range 35–40° F., to remove by evaporation the alcohol produced by the decomposition of the ethyl silicate resulting in the formation of hydrated silica gel. This low drying temperature is maintained to control the rate of evaporation and to maintain the evaporation rate at the surface substantially the same as the rate of flow of the liquid from the interior to the surface so as to avoid cracking. The formed green set material is then placed in a kiln and fired to a suitable elevated temperature, such as a temperature of about 1450° F. to about 1600° F., more or less, a temperature above the melting point or fusion point of the relatively low melting fluxing component of the admixture but below the melting or fusion point of the high melting refractory component of the admixture. As the shaped material is being heated to eventually fuse or melt the low melting fluxing material, water is driven out so that the silica gel is dehydrated when the temperature reaches about 300–400° F. As the silica gel component of the shaped material is dehydrated it shrinks around and between the particles of the relatively high melting point refractory material and the relatively low melting point fluxing material, forming communicating pores in the overall structure and imparting permeability thereto while at the same time yielding a silica-containing material, and eventually silica, a material which may also be considered a high melting refractory material because of its high melting point (about 3110° F.). The heating or firing is continued to melt the relatively low melting point fluxing component so as to sinter the entire mass together by means of a glassy bond derived from the fusion of fluxing material throughout the mass. This heating operation produces a hard, strong, highly permeable material with a substantially smooth surface free of cracks and with pore openings having a maximum diameter of about 0.004" (100 microns).

The present invention also contemplates making from this new ceramic material a mold or die for jiggering, die forming, pressing or slip-casting shapes of plastic clay bodies. This invention also includes a mold or die made from such material and combining high strength and durability, high permeability and a substantially smooth, non-plugging surface giving instant and uniform release from the formed clay.

Other objects and advantages of the present invention will appear from the following detailed description of preferred forms and methods of making the same.

In the accompanying drawings,

FIG. 3 is a cross-section through a pair of mating dies for hydraulic pressing of plastic clay bodies, showing the fired ceramic dies secured in metal holders with fluid passages communicating with the permeable dies;

FIG. 4 is a top plan view of one of the metal die holders;

FIG. 5 is a cross-section taken substantially on the line 5—5 of FIG. 4;

FIG. 6 is a detailed cross-section through a die mounted in its holder showing the fluid inlet and outlet connection;

FIG. 7 is a detailed section through a portion of a backing plate of a die holder showing removable filling in the fluid passages;

FIG. 8 is a similar view showing a permeable die positioned against the fillers in the backing plate;

FIG. 9 is a diagrammatic illustration of a vertical section through the new ceramic material of this invention illustrating the communicating pores enlarged about 600 times;

FIG. 10 is an illustration of a ceramic jiggering mold showing a plastic clay body in place and a ceramic pressing tool or stamper for forcing the body into firm engagement with the mold;

FIG. 11 is a similar view showing the presser at the bottom of its stroke;

Figure 1:
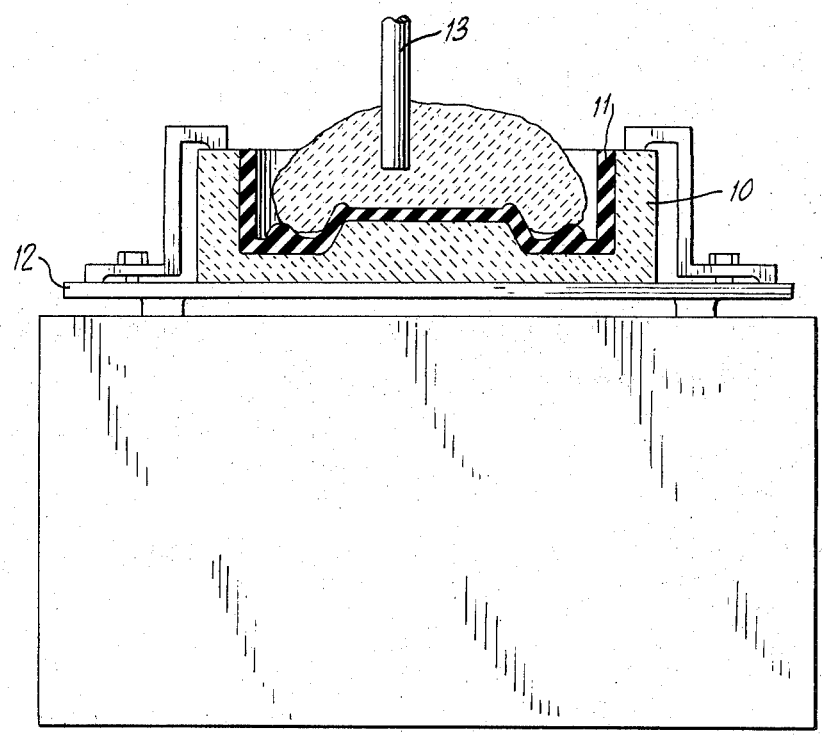
FIG. 1 is a vertical section through a rubber-faced mold for shaping dies for hydraulic pressing of plastic clay bodies, the mold being mounted on a vibrating table and containing a mass of the moist mixture of this invention.

The permeable ceramic material of this invention consists principally of ground or crushed relatively high melting point refractory ceramic material or aggregate. The preferred aggregate is wollastonite, a naturally occurring mineral consisting primarily of $CaSiO_3$. This material when ground or crushed has a tendency to form short fibers or needle-like particles and has a melting point of about 2804° F. Other suitable ceramic materials include alumina (melting point about 3686° F.), mullite ($3Al_2O_3 \cdot 2SiO_2$), calcined clay, fused, ground silica and mixtures thereof. Mullite, like wollastonite, has a tendency when crushed or ground to form into needle-like particles. Accordingly, wollastonite and mullite are preferred since such materials tend to impart maximum permeability in the finished product. Alumina and the other named refractory materials tend to yield a somewhat lesser degree of permeability in the finished product but such finished products nevertheless possess a much greater permeability than heretofore achieved in porous plaster molds and with much greater hardness, strength and durability.

In another preferred embodiment of this invention for producing a finished product having maximum permeability wollastonite or mullite or a mixture of these two materials in any proportions, together with a minor amount of other refractory ceramic materials, is employed. The admixture of alumina with wollastonite or mullite increases the compressive strength of the finished product without substantially reducing its permeability.

The refractory aggregate material or materials are ground or crushed to a particle size so that substantially all of the ground aggregate passes a sieve of 100 mesh, corresponding to a particle size of 149 microns or smaller. Preferably more than half of the particles pass a sieve of 200 mesh, corresponding to a particle size of 74 microns or smaller.

The dry refractory aggregate material is mixed with the dry fluxing material and with dry activating or alkalizing agents, such as MgO, which react with the silica gel forming materials also incorporated in the mixture. The preferred relatively low melting fluxing material is rasorite 65, which is anhydrous borax ($Na_2B_4O_7$) containing over 65% $B_2O_3$ and less than 1% water. This material is ground or crushed to a particle size to pass a 200 mesh sieve, corresponding to particles of about 74 microns, and is mixed in an amount to constitute a minor amount, such as from about 3% to about 20% by weight, of the dry mixture.

Other fluxing materials may also be used, including fused and ground frits or glasses. A typical commercially available frit which may be used has the following chemical analysis: $K_2O$, 2.3%; $Na_2O$, 15.3%; CaO, 6.3%; $Al_2O_3$, 3.7%; $B_2O_3$, 2.6%; $SiO_2$, 69.8%.

Another fluxing material which may be used is colemanite, which is a natural hydrated calcium borate having the composition $Ca_2B_6O_{11} \cdot 5H_2O$. The natural material includes also small amounts of oxides of iron, aluminum, magnesium, silicon and sodium and organic materials.

Similarly, other borates may be used as the fluxing material, such as ulexite, sodium calcium borate, $$NaCaB_5O_9 \cdot 8H_2O,$$

or commercially available mixtures of calcium borates and sodium calcium borates.

The fluxing material may also be glass cullet which is commercially available ground glass scrap of the window glass type embodying sufficient sodium and calcium compounds to make the melting point suitable for the fluxing action.

The fluxing material may be mixtures of the foregoing fluxing materials in any proportions. The fluxing material is preferably ground or crushed to pass through a 200 mesh sieve. It is a characteristic of this invention that the relatively low melting fluxing material has a melting point or fusion point lower, such as at least about 200° F. lower, than the relatively high melting point refractory ceramic material admixed therewith. For example, in accordance with one embodiment of this invention the melting point of the lowest melting point fluxing material making up a composition in accordance with this invention is lower than the melting point of the lowest melting point refractory ceramic component, i.e. the so-called refractory high melting ceramic component. Desirably, the fluxing material has a melting or fusion point in the range above about 1000° F. to about 2000° F., more or less, such as a melting or fusion point in the range from about 1400° F. to about 1900° F.

When the green bond in the initially prepared admixture is to be obtained by means of ethyl silicate, the blended dry ingredients are mixed with hydrolyzed ethyl silicate in a minor amount, such as an amount of from 30% to 50% of the weight of the dry ingredients. Preferably ethyl silicate 40, which is a mixture of ethyl polysilicates with a silica content of about 40%, is hydrolyzed with water and hydrochloric acid to produce a liquid containing from about 5 to about 25 grams of silica per 100 cubic centimeters, with a relatively low pH value. This liquid is mixed with the dry ingredients for a few minutes, the mixing preferably stopping before the chemical reaction begins. To assist the liquid in wetting and surrounding all of the dry materials a wetting agent, such as ethylene glycol, is added in an amount equal to about 0.1% to about 0.2% of the dry materials.

After mixing the material is in the form of a moist plastic mass which can be shaped but is too stiff to flow freely. A quantity of the moist mixture is then placed in a suitable mold or form such as the mold 10 shown in FIGS. 1 and 2 which is lined with a layer of rubber 11 shaped to form the desired contour of the finished ceramic article. As shown, the mold 10 is designed to produce a die for the hydraulic pressing of plastic clay ware.

The mold 10 is preferably mounted on a vibrating table 12 which is powdered to vibrate vertically at a relatively high frequency, such as 3600 cycles per minute. The material is also tamped from its upper surface with an electric vibrator 13 to free the mixture of any air bubbles. The vibration of the vibrating table 12 is continued, with increasing amplitude if necessary, until a thixotropic action occurs in the mixture, causing it to flow suddenly into full, sharp conformity with the face of the mold 10 as shown in FIG. 2.

Figure 2:
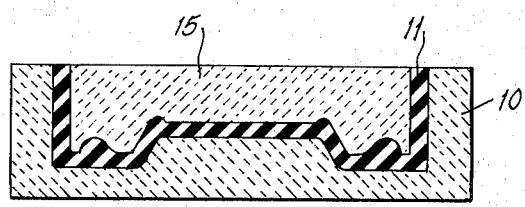
FIG. 2 is a view similar to FIG. 1 showing the mass of moist mixture after flowing into conformity with the mold by thixotropic action.

As soon as the mixture has conformed to the mold as shown in FIG. 2, the mold is allowed to stand without agitation. The alkalizing agent, such as magnesium oxide, dissolves slowly into the available liquid, raising the pH value of the mixture and causing the ethyl silicate to separate into ethyl alcohol and hydrated silica gel, $Si(OH)_x$. As this reaction proceeds the mix begins to set and when the reaction is completed, usually in about 1 to 2 hours, the shaped form 15 is hard enough to remove from the mold and it is then placed in a dryer. The dryer encloses the shaped forms and is provided with only low air circulation so as to maintain high humidity about the surfaces of the forms. The dryer is cooled to a temperature of from 35° to 40° F. and the shaped forms are allowed to dry for about 24 hours. The rate of evaporation of the ethyl alcohol derived from the ethyl silicate is retarded by maintaining high humidity and low temperature in the dryer. This avoids cracking or warping during drying by maintaining the rate of evaporation at the surfaces substantially the same as the rate flow of the liquid to be evaporated from the interior to the exterior of the form.

The low temperature drying is continued until the alcohol has evaporated, substantially all of the water remaining in the hydrated silica gel.

The mixing of the materials and the flowing of the mass by thixotropic action results in the particles of refractory ceramic aggregate and fluxing material being uniformly distributed throughout the hydrolyzed ethyl silicate, so that the particles, after the drying operation, are surrounded and separated from adjoining particles by the hydrated silica gel. During the low temperature drying the outside dimensions of the shaped forms remain substantially constant, undergoing a shrinkage from less than 1% to about 3%, depending upon the composition of the admixture. When the admixture consists of or contains a substantial proportion of wollastonite or mullite and the water addition is maintained at a minimum, the overall drying shrinkage is of minimum value.

The forms are then placed in a kiln and fired on a 24 hour cycle to a suitable temperature to fuse the fluxing material therein. As the green forms are heated up the remainder of the water is driven off so that the silica gel is dehydrated by the time the temperature reaches about 400° F. During this heating operation, the silica gel is substantially reduced in volume by the evaporation of the water, the shrinkage occurring in the silica gel itself and around and between the particles of aggregate, forming intercommunicating capillary pores extending throughout the material and opening through the surfaces of the forms with a maximum pore diameter of about .004 of an inch. When the fusion temperature of the fluxing material is attained the fluxing material melts and, being uniformly distributed throughout the mass binds the high melting refractory ceramic aggregate and the silica material derived from the dehydration of the silica gel together by means of a glassy bond, firmly binding the resulting material into a hard, strong, permeable body. The total shrinkage during firing is small, varying from about .2% to about 3% depending upon the amount of flux included in the aggregate.

As illustrated in FIG. 2, the thickness of the molded forms may be readily controlled by initially over-filling the rubber-faced mold 10 and scraping off the excess level with the top of the mold after the mixture has flowed into conformity with the mold.

The procedure is substantially the same when other materials are used to form the green bond, such as polymeric silicic acid sol. This material is a free flowing liquid with a pH of about 9.8 and is commercially available under the trade name Synar. To bring about the desired reaction a slowly soluble material which will raise the pH value is mixed with the dry materials. This may be a material known as "Activator 05" which is a slowly soluble soda-aluminum-silica glass having the composition of about 29% $Na_2O$, 4% $Al_2O_3$, and 65% silica. This activator is added to the mix in amounts from 2% to 16% by weight of colloidal silica present. As the activator dissolves, the pH of the mix increases to the range from 10.5 to 12, which causes the silicic acid sol to precipitate or gel, forming hydrated silica gel as a gelatinous precipitate. When the forms have dried to an initial set they are fired as described above, first to dehydrate the silica gel and then to form the glassy bond.

The specific treatment and the physical properties obtained with various compositions are illustrated by the following examples:

TABLE I

| | Parts by weight | | | |
|---|---|---|---|---|
| | Ex. 1 | Ex. 2 | Ex. 3 | Ex. 4 |
| Material: | | | | |
| Wollastonite | 90.0 | 90.0 | 90.0 | 90.0 |
| Alumina | | | | 5.0 |
| Rasorite 65 | 10.0 | 10.0 | 10.0 | 10.0 |
| Magnesium oxide addition | .5 | .5 | .5 | .5 |
| Wetting agent Photo Flo | .1 | .1 | .1 | .1 |
| Hydrolyzed ethyl silicate 40, 7.5 gm. silica/100 c.c. | | | | 33.0 |
| Hydrolyzed ethyl silicate 40, 12.5 gm. silica/100 c.c. | 36.0 | 38.0 | 36.0 | |
| Water addition | 4.0 | 4.0 | 4.0 | |
| Setting time, min | 20 | 20 | 20 | 20 |
| Firing temp., ° F | 1,544 | 1,544 | 1,544 | 1,600 |
| Drying shrinkage, percent | 1.6 | 1.6 | 1.5 | |
| Total fired shrinkage, percent | 2.4 | 2.0 | 2.6 | 1.9 |
| Permeability at 25 lbs. pressure: | | | | |
| Min | .78 | .77 | 1.58 | .96 |
| C.c. | 250 | 250 | 250 | 250 |
| Permeability at 20 lbs. pressure: | | | | |
| Min | | | | 1.38 |
| C.c. | | | | 250 |
| Modulus of rupture, p.s.i. | 2,860 | 2,600 | 3,140 | 4,880 |
| Compressive strength, p.s.i. | 6,640 | 5,350 | 7,550 | 9,160 |
| Absorption cold water soak | | | | 21.5 |
| Absorption boiling, percent | 29.3 | 33.6 | 29.5 | 24.8 |

TABLE II

| | Parts by weight | | | |
|---|---|---|---|---|
| | Ex. 5 | Ex. 6 | Ex. 7 | Ex. 8 |
| Material: | | | | |
| Wollastonite | 90.0 | 95.0 | 85.0 | 80.0 |
| Alumina | | | 5.0 | 5.0 |
| Rasorite 65 | | 5.0 | 10.0 | 15.0 |
| Ferro body frit 3110 | 10.0 | | | |
| Magnesium oxide addition | .5 | .5 | .5 | .5 |
| Hydrolyzed ethyl silicate 40, 16.0 gm. silica/100 c.c. | 45.0 | 40.5 | 40.0 | 40.0 |
| Water addition | 5.0 | 4.5 | 5.0 | 5.0 |
| Setting time, min | 20 | 20 | 20 | 20 |
| Firing temp., °F | 1,840 | 1,520 | 1,544 | 1,544 |
| Drying shrinkage, percent | 2.6 | 1.3 | 2.1 | 1.9 |
| Total fired shrinkage, percent | 3.2 | 1.5 | 2.6 | 5.3 |
| Permeability at 25 lbs. pressure: | | | | |
| Min | 1.44 | 1.0 | .45 | .21 |
| C.c | 250 | 250 | 250 | 250 |
| Modulus of rupture, p.s.i | 1,530 | 2,130 | 2,360 | 2,160 |
| Compressive strength, p.s.i | 3,340 | 5,370 | 8,700 | 10,900 |
| Absorption cold water soak | 29.7 | 30.0 | 25.0 | 16.5 |
| Absorption boiling, percent | 33.5 | 34.5 | 30.7 | 23.0 |

TABLE III

| | Parts by weight | | | |
|---|---|---|---|---|
| | Ex. 9 | Ex. 10 | Ex. 11 | Ex. 12 |
| Material: | | | | |
| Wollastonite | 90.0 | 10.0 | 50.0 | 10.0 |
| Alumina | | 80.0 | | |
| Frit 3110 | 10.0 | | | |
| Mullite 325 mesh | | | 40.0 | 80.0 |
| Rasorite | | 10.0 | 10.0 | 10.0 |
| Magnesium oxide | | .5 | .5 | .5 |
| Addition Activator 05 | 5.0 | | | |
| Addition Synar, c.c | 42.5 | | | |
| Hydrolyzed ethyl silicate 40, 7.5 gm. silica/100 c.c. | | 34.0 | 34.0 | 34.0 |
| Wetting agent Photo Flo, c.c | | .25 | .25 | .25 |
| Setting time, min | 90 | | | |
| Firing temp., °F | 1,886 | 1,520 | 1,520 | 1,520 |
| Drying shrinkage, percent | 2.2 | 1.1 | 0.9 | 0.9 |
| Total fired shrinkage, percent | 2.7 | 3.7 | 3.8 | 5.6 |
| Permeability at 25 lbs. pressure: | | | | |
| Min | 5 | 6.38 | .5 | .56 |
| C.c | 250 | 250 | 250 | 250 |
| Modulus of rupture, p.s.i | 2,720 | 3,160 | 3,015 | 3,580 |
| Compressive strength, p.s.i | 6,450 | 7,580 | 6,500 | 11,150 |
| Absorption cold water, percent | 22.0 | | | |
| Absorption boiling, percent | 28.8 | 22.3 | 22.2 | 18.3 |

In the above tables the permeability is shown by the time in minutes required for 250 c.c. of water to pass through a disc of the material 2 inches in diameter and 1 inch thick under a pressure of 25 p.s.i. In comparison, a corresponding test piece of a commecially available porous plaster of Paris mold used in the pressing of clay ware required 15 minutes to pass 250 c.c. of water at 50 pounds pressure, and the modulus of rupture of the material is less than 1400 p.s.i. Thus, each of the above examples has a permeability many times greater than the known material combined with much greater strength.

The hardness of the fired material made according to the foregoing examples ranges from 4.5 to 9.0 on the Moh's scale. The high permeability of the material results from a high percentage of porosity. Thus a die made from the material of Example 4 has pores constituting 43% of the volume of the die.

Permeable ceramic articles of any designed shape and for any desired use may be produced from the new material of this invention. For use in the ceramics industry the combination of high permeability with high strength and small pore openings make the material particularly useful for molds and implements used in jiggering plastic clay bodies, for slip-casting molds and for dies used in pressing of plastic clay bodies.

The shaped form 15 shown in FIG. 2 produces, after firing, a female pressing die 16 to cooperate with a mating male die 17 composed of the same material. As shown in FIG. 3, each of the dies 16 and 17 is mounted in a metal carrier 18 and 19, respectively, which are arranged to be mounted in a suitable press so that a body of plastic clay can be placed on the lower die 16 and pressed between the two dies under a pressure of about 630 p.s.i. to form green clay ware such as the dish 20 shown in broken lines in FIG. 3.

To extract water of plasticity from the clay during pressing, each of the dies is provided with fluid connections communicating with the back face of the die. As illustrated in FIGS. 4 and 5, the holder 18 includes a substantially cylindrical side wall 21 and a flat back face 22 removably secured to the side wall 21 as by screws 23. Adjusting screws 24 are threaded through the side wall 21 and are arranged to engage the cylindrical side wall of the die 16 so that it may be placed within the holder 18 and then accurately located for exact alignment with its mating die. The cylindrical side wall 21 also carries upwardly projecting pins 25 adapted to enter aligned holes 26 in the male die holder 19.

The back plate 22 of the die holder 18 is formed in any suitable way with fluid passages to communicate with the back face of the die 16. As shown, the plate 22 is formed with a series of circular concentric grooves 27 each intersecting a diametric groove 28.

Before the die 16 is placed in the holder 18 the grooves 27 and 28 are filled with a readily removable filler such as cords 30 of asbestos cement or the like which is arranged to fill the groove flush with the surface of the plate 22 as shown in FIG. 7. The mold 16 is then placed in the holder 18, centered by means of the screws 24 and held a sufficient distance from plate 22 to provide a sufficient space around the die 16 to allow the subsequent filling of such space by pouring in of a suitable sealing material. A suitable sealing material 32 such as epoxy resin or a low melting point metal in molten condition is then poured between the cylindrical side wall 21 and plate 22 and the die 16 completely filling the space.

After the material has completely set the plate 22 is removed from the cylindrical side wall 21 by removing screws 23 and the filler 30 is removed from the grooves. A series of holes 31 are then drilled through the sealing material 32 ¼ inch to 1 inch in diameter and ½ inch to 2 inches apart the centers of which are located above the centerline of the grooves 27 in plate 22. The holes 31 are sufficiently deep to penetrate the sealing material 32 and provide continuous air passage to the die 16. At the same time a recess 35 is cut or drilled in the ceramic mold 16 communicating with a hole 36 extending through the side wall 21 into a screw fitting 37. The recess 35 is positioned in alignment with the diametric groove 28 and since the cords 30 prevent the sealing material from covering the back face of the mold, the grooves 27 and 28 form a network of passages communicating with the mold 16 and the fitting 37. The plate 22 is then replaced and fastened by the screws 23.

The fittings 37 are adapted to be connected to hoses and valved piping so that vacuum may be established in each of the dies to draw off water, or fluid under pressure may be passed through the dies to release ware or to purge the dies.

In using the dies 16 and 17 for pressing plastic clay bodies the holders 18 and 19 are mounted in a suitable press with the pins 25 in alignment with the holes 26. Suitable tubes or hoses are connected to the fittings 37 and arranged to be connected to a pump or other suitable source of vacuum. A body of plastic clay is placed between the dies which are then forced together by the press to shape the clay into the desired form such as the dish 20 indicated in FIG. 3, any excess clay being squeezed out into the flash channel formed by the mating circular grooves 34. As the clay is pressed to form, the water of plasticity is forced out and because of the high degree of porosity of the material of this invention the expressed water passes through the dies, through the holes 31 into the grooves 27 and 28 and is drawn off by the vacuum through the fittings 37.

It is found that with dies constructed in accordance with the present invention, with a pressure of about 630 p.s.i. maintained for only about 1 to 10 seconds, sufficient water is expressed and removed from the plastic clay to reduce the clay substantially to the critical shrinkage point. Thus, plastic clay containing about 22% water and which shrinks about 4% if dried in the conventional manner when pressed between dies of the present invention at a pressure of 630 p.s.i. for 10 seconds with a vacuum of 23 inches of mercury applied to the fittings 37 has its moisture content reduced to about 17% so that the shrinkage of the green pressed ware upon subsequent drying is less than 1%. This substantial elimination of the drying shrinkage greatly improves the quality of the ware and greatly reduces the number of warped, cracked, or otherwise defective pieces.

The rapidity with which the water of plasticity may be expressed from the clay is the result of the high porosity of the dies, the microstructure of which is illustrated in FIG. 9. The needle-like particles of aggregate arranged in random orientation indicated at 40 in FIG. 9 are surrounded by communicating voids produced by the dehydration of the silica gel during the initial portion of the firing and the fusing of the flux during the final stages of the firing so that communicating passages throughout the body are provided for the free flow of fluid as indicated by the arrows 41. At the same time, the pores opening through the surfaces of the die are small enough so that the plastic clay does not extrude into or become interlocked with the die surfaces.

It is found by actual measurement that material according to Example 4 above has a total porosity of 43% with 92% of the pore volume being of a size between 3 microns and 9 microns the maximum sized pores being not over 100 microns or .004 of an inch. By comparison a conventional porous plaster of Paris die has a total porosity of 32.9% and 89% of the pore volume is between 0.3 and 3.0 microns in size.

Whenever necessary the dies can be purged of water by the intermittent application of air pressure through the fittings 37 or merely by the intermittent application of vacuum since the porosity of the material is such that water may readily be drawn through the die.

The relatively hard aggregate and flux results in a die several times stronger than plaster dies with a greater resistance to abrasive wear. This allows the use of higher pressing pressures and greatly reduces the wear on the die by abrasion and by the erosive action of the water flow. Furthermore, the high porosity allows the ware to be removed more easily from the mold, thus shortening the production cycle and increasing the production capacity of the pressing machinery.

Additional uses for the material of this invention in the manufacture of ceramic ware are illustrated in FIGS. 10 through 14. As shown in FIG. 10, a jiggering mold 45 may be made from the material of this invention in the manner described above to conform to the shape of one surface of the finished article. In accordance with one method of jiggering, a body 46 of plastic clay may be placed on the mold 45 and caused to adhere by striking it with a stamper. For this purpose a stamper 47 may be made from the material of this invention and formed with a suitable working face to strike the clay. The stamper 47 is mounted in a carrier 49 which is provided with passages 50 connected to a fitting assembly 51 which in turn may be connected through suitable piping and valves to sources of vacuum and air pressure. This arrangement allows the stamper 47 to be connected to vacuum to suck up free water from the clay body 46, as well as to allow it to be subjected to fluid pressure for releasing the stamper from the clay body to insure its adhesion to the mold 45.

Figure 12:
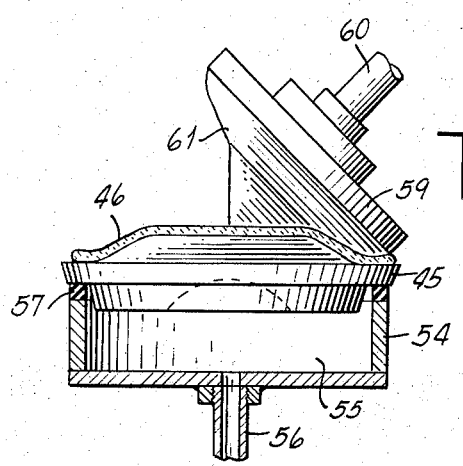
FIG. 12 is a section through a ceramic jiggering mold showing a roller tool engaging and forming a plastic clay body, the mold being mounted on a conventional vacuum chuck.
Figure 14:
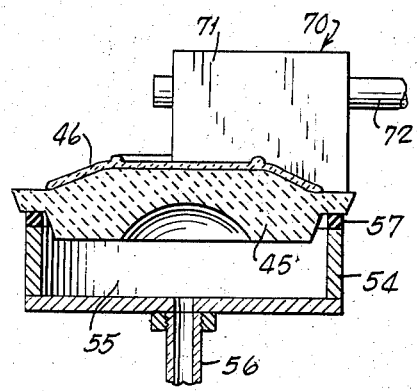
FIG. 14 illustrates a jiggering mold with a clay body formed thereon by the method shown in either FIG. 12 or FIG. 13, the mold being rotated under a profile tool.

The stamper 47 distributes the clay body 46 over the surface of the mold 45 and causes it to adhere firmly to the mold 45 preparatory to further operations which may be carried out as shown in FIGS. 12 and 14. One method of finish forming the article on the mold 45 is to employ a rolling process in which the mold 45 is mounted in a vacuum chuck 54. The chuck 54 includes a chamber 55 which is connected to a vacuum source through pipe 56, and a sealing ring 57 is provided between the vacuum chuck 54 and the mold 45 to prevent air leakage and insure that the mold will be tightly held in the chuck. The chuck is then rotated and a roller tool 59, which is free to rotate about the axis of its shank 60, is brought against the clay body to cause the latter to spread over the surface of the mold 45 and to impart to the upper surface of the body the form determined by the shape of the contoured surface 61 of the roller tool. After the clay body has been shaped, the vacuum is released from the vacuum chuck 54 so that the mold 45 may then be removed for further processing.

Another method which may be employed in finish forming the ware is shown in FIG. 14, where the mold 45 is held in the vacuum chuck 54 and rotated while the clay body 46 is formed by a profile tool 70. The profile tool 70 may be in the form of a steel blade 71 mounted on a suitable holder 72 so that it may be brought to bear on the exposed surface of the clay body and shape the latter during continued rotation of the chuck and mold until the finished shape corresponding to the contour of the profile tool 70 is achieved. The mold 45 is then removed from the vacuum chuck 54 for further processing.

Figure 13:
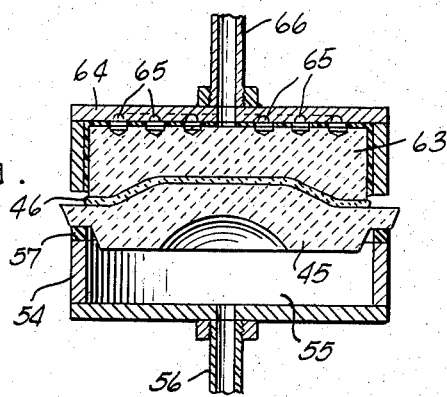
FIG. 13 illustrates a ceramic jiggering mold with a clay body formed thereon by a contoured pressing die.

Instead of causing the clay body to adhere to the mold 45 by a stamper 47 as shown in FIG. 11 it is possible, when the mold 45 is made of the strong porous material of this invention, to further form the clay as illustrated in FIG. 13, where a pressing die 63 is used to form the plastic body and cause it to adhere to the mold 45. The pressing die 63 is made in the same manner as the mold 45 and mounted within a carrier 64 which is provided with passages 65 for connection to a fitting assembly 66, which in turn is connected to sources of vacuum and air pressure for the purpose described above. The body 46 is placed on the mold 45 and struck by the pressing die 63. The water that is expressed is drawn off by vacuum through the mold and the die, and the vacuum is then released in the die 63, or fluid pressure is applied so that the die 63 may be raised and the ware may then be given its final shape by jiggering as shown in either FIG. 12 or FIG. 14.

The material of the present invention used to form any of the clay forming implements illustrated in FIGS. 10 to 14, inclusive, produces many substantial advantages and economies in the forming of ware from plastic clay. Because of its much greater strength and durability the mold 45, stamper 47 and die 63 may be subjected to greater pressures and also have a much longer life than such implements when constructed of plaster of Paris or similar materials heretofore used. Greater pressures are also made possible because the additional water thereby expressed from the clay is quickly drawn off by the vacuum applied to and acting through the implements. Similarly, release of the ware can be effected much more rapidly. In addition, the mold 45 constructed of the material of this invention permits a great reduction in the time heretofore required for the drying of the ware to the leather hard state so that it can be removed from the mold and sent to the bisque firing operation. This is possible because the mold 45 with the green ware positioned on it can be heated to accelerate the drying without damaging the mold such as would occur if it were attempted to heat the ware on the conventional plaster of Paris molds heretofore used.

Although preferred embodiments of the invention have been described in considerable detail it is to be understood that many variations and rearrangements of the parts, materials and steps may be resorted to without departing from the scope of the invention as defined in the following claim.

We claim:

1. A fired, liquid permeable, hard, durable, ceramic mass useful as a mold or die for shaping plastic clay bodies and having substantially smooth, non-plugging working surfaces which give instant and uniform release from the shaped clay bodies, said mass being characterized by communicating capillary channels or pores, total porosity constituting about 43% of the volume of said mass, 92% of the pore volume being of a size between 3 and 9 microns and imparting permeability to said mass, the pore openings on the surface of said mass having a maximum diameter of about 100 microns, said mass consisting essentially of and having uniformly distributed therein finely divided wollastonite having an initial particle size below 100 mesh, finely divided alumina having an initial particle size below 100 mesh, fused finely divided fluxing material having an initial particle size below about 200 mesh, said fluxing material being anhydrous borax having a melting point at least about 200 degrees Fahrenheit lower than the melting point of said wollastonite, and finely divided silica derived by the in situ dehydration within said mass of silica gel alkalized with magnesium oxide, said wollastonite, said alumina, said anhydrous borax and said magnesium oxide being present in said mass in the ratio in parts by weight, respectively, 90.0, 5.0, 10.0, 0.5, said silica being present in the amount derived from 33 parts by weight hydrolyzed ethyl silicate containing 7.5 gm. silica per 100 cc., said wollastonite, said alumina and said finely divided silica being held together within said mass by a glassy bond of said anhydrous borax fused in situ to form said fired, liquid permeable, hard, ceramic mass, said mass having been fired at a temperature of about 1600° F. and having a permeability with respect to water measured at 25 pounds pressure through a disc of said mass measuring 2 inches in diameter and 1 inch thick of 250 cc. in 0.96 minute.

References Cited

UNITED STATES PATENTS

| | | | |
|---|---|---|---|
| 2,910,760 | 11/1959 | Jackson | 106—63 X R |
| 2,818,619 | 1/1958 | Bradley et al. | 22—193 |
| 3,271,323 | 9/1966 | Whittemore | 106—40 X R |
| 2,809,898 | 10/1957 | Thiess | 106—38.9 |
| 2,892,227 | 6/1959 | Operhall | 106—38.9 |
| 3,271,323 | 9/1966 | Whittemore | 106—40 |

HELEN M. McCARTHY, Primary Examiner

U.S. Cl. X.R.

106—38.35, 38.9, 63, 65, 73.4, 73.5; 264—43